(12) United States Patent
Sardet et al.

(10) Patent No.: US 11,486,375 B2
(45) Date of Patent: Nov. 1, 2022

(54) OSCILLATING PISTON PUMP COMPRISING A ONE-PIECE STRUCTURAL ELEMENT HAVING A FIRST AND A SECOND HOLLOW TUBULAR BODY

(71) Applicant: SAUERMANN INDUSTRIE, Chevry-Cossigny (FR)

(72) Inventors: Francois Sardet, Combs-la-Ville (FR); Olivier De Gea, Saint Vrain (FR); Jean-Baptiste Boussuge, Lamonzie-Saint-Martin (FR); Didier Cleveland, Gours (FR)

(73) Assignee: SAUERMANN INDUSTRIE, Chevry-Cossigny (FR)

( * ) Notice: Subject to any disclaimer, the term of this patent is extended or adjusted under 35 U.S.C. 154(b) by 0 days.

(21) Appl. No.: 17/049,913

(22) PCT Filed: Feb. 12, 2019

(86) PCT No.: PCT/EP2019/053462
§ 371 (c)(1),
(2) Date: Oct. 22, 2020

(87) PCT Pub. No.: WO2019/158536
PCT Pub. Date: Aug. 22, 2019

(65) Prior Publication Data
US 2021/0190051 A1    Jun. 24, 2021

(30) Foreign Application Priority Data
Feb. 16, 2018    (FR) ..................................... 1851355

(51) Int. Cl.
*F04B 17/04* (2006.01)
*F04B 53/10* (2006.01)
(Continued)

(52) U.S. Cl.
CPC .......... *F04B 17/044* (2013.01); *F04B 17/046* (2013.01); *F04B 53/1087* (2013.01);
(Continued)

(58) Field of Classification Search
CPC ...... F04B 17/04; F04B 17/046; F04B 17/044; F04B 53/1087; F04B 53/16; F04B 49/22;
(Continued)

(56) References Cited

U.S. PATENT DOCUMENTS 3,512,808 A * 5/1970 Graham ................... F16L 37/56
285/189
4,389,166 A * 6/1983 Harvey ................... F04B 35/04
417/234

(Continued)

FOREIGN PATENT DOCUMENTS

EP    2388481 A1    11/2011
FR    1554354 A    1/1969

OTHER PUBLICATIONS

French Search Report and Written Opinion dated Oct. 31, 2018 for corresponding French Application No. 1851355, filed Feb. 16, 2018.
(Continued)

*Primary Examiner* — Kenneth J Hansen
(74) *Attorney, Agent, or Firm* — David D. Brush; Westman, Champlin & Koehler, P.A.

(57) ABSTRACT

An oscillating piston pump including: a first hollow tubular body in which a piston moves; a second hollow tubular body extending around the first hollow tubular body, carrying a solenoid that controls the movement of the piston, the first tubular body and the second tubular body forming a one-piece structural element.

14 Claims, 4 Drawing Sheets

(51) Int. Cl.
  *F04B 53/16* (2006.01)
  *F16B 21/18* (2006.01)
  *H02K 33/10* (2006.01)

(52) U.S. Cl.
  CPC ............. *F04B 53/16* (2013.01); *F16B 21/186* (2013.01); *H02K 33/10* (2013.01)

(58) Field of Classification Search
  CPC ........ H02K 33/02; H02K 33/10; H02K 33/16; F16B 21/18; F16B 21/16; F16B 21/186
  See application file for complete search history.

(56) References Cited

U.S. PATENT DOCUMENTS

| | | | | |
|---|---|---|---|---|
| 4,487,556 | A * | 12/1984 | Wiernicki | H02K 33/02 318/130 |
| 4,775,301 | A * | 10/1988 | Cartwright | F04B 17/046 137/859 |
| 9,028,227 | B2 | 5/2015 | Sardet | |
| 2004/0146417 | A1 | 7/2004 | Dunn | |
| 2011/0286868 | A1 * | 11/2011 | Sardet | H02K 33/16 417/417 |
| 2012/0251359 | A1 | 10/2012 | Neelakantan et al. | |
| 2013/0333767 | A1 * | 12/2013 | Schmidt | F16L 37/35 137/15.18 |
| 2015/0137516 | A1 * | 5/2015 | Pangburn | F04B 53/16 285/347 |
| 2017/0051731 | A1 * | 2/2017 | Ott | F04B 17/046 |
| 2019/0101108 | A1 * | 4/2019 | Lee | B05B 11/305 |

OTHER PUBLICATIONS

International Search Report dated Mar. 19, 2019 for corresponding International Application No. PCT/EP2019/053462, filed Feb. 12, 2019.

Written Opinion of the International Searching Authority dated Mar. 19, 2019 for corresponding International Application No. PCT/EP2019/053462, filed Feb. 12, 2019.

International Preliminary Report on Patentability dated Jul. 5, 2019 for corresponding International Application No. PCT/EP2019/053462, filed Feb. 12, 2019.

English translation of the International Preliminary Report on Patentability Chapter II dated Jul. 5, 2019 for corresponding International Application No. PCT/EP2019/053462, filed Feb. 12, 2019.

* cited by examiner

OSCILLATING PISTON PUMP COMPRISING A ONE-PIECE STRUCTURAL ELEMENT HAVING A FIRST AND A SECOND HOLLOW TUBULAR BODY

1. FIELD OF THE INVENTION

The field of the invention is that of pumping devices for the removal of condensates, intended to be used in systems producing condensates, in particular air-conditioning systems, refrigeration systems, ventilation systems or heating systems.

More particularly, the invention concerns an electromagnetic pump with oscillating magnetic piston.

2. TECHNICAL BACKGROUND

Electromagnetic pumps with oscillating pistons are currently used in many applications, including coffee machines, automatic dispensers, steam ironing devices, irrigation systems, air-conditioning systems, the automotive industry, etc.

In these various applications, it is known to use an electromagnetic pump, an example of which is illustrated in FIG. 1.

Such a pump comprises:
- a first substantially tubular hollow body 1, or liner, extending along a longitudinal direction
- a second substantially tubular hollow body 2, or coil former, extending along a longitudinal direction around the first body 1,
- a coil 3 powered by a rectified AC current forming a solenoid,
- a magnetic piston 5 mounted so as to move longitudinally inside the first body 1, the piston per se being hollow and traversing it longitudinally,
- a fluid suction chamber $6_2$ and a discharge chamber $6_1$ located on either side of the piston,
- two springs $7_2$, $7_1$ mounted respectively in the suction chamber $6_2$ and extending between the fluid inlet and the magnetic piston 5, and in the discharge chamber $6_1$ and extending between the magnetic piston 5 and the fluid outlet,
- an external magnetic frame 9 and, where appropriate, at least two magnetic rings for channelling the magnetic flux.

The magnetic field created by the coil 3 forms a solenoid driving the alternating axial movements of the piston 5 inside the liner 1.

Each back-and-forth movement of the piston 5 thus drives the suction of the condensates into the suction chamber $6_2$, and then the discharge of the condensates towards the discharge chamber $6_1$.

The general operating principle of such a pump is described in the prior art of patent document EP2388481, issued in the name of the applicant.

As observed on the pump of FIG. 1, currently used pumps utilise a large number of parts, which must be assembled with precision in order for the device to operate optimally.

The resultant manufacture and fitting are therefore relatively complex.

Furthermore, once the pump is assembled, non-negligible transverse stresses may be exerted on the liner 1, in particular on its ends, tending to deform the liner and thus causing it to lose its straightness.

A risk then arises that, during its movement, the piston 5 will rub against the walls of the liner 1 and that its back-and-forth movements are hindered.

This results in a loss of efficiency of the pump and poor hydraulic performance, and even in the risk of wear or blockage. This is of course problematic, in particular in applications where the pump must operate for long periods of time (several months, or even years) without servicing, and/or where a breakdown could cause overflows.

Another example of an electromagnetic pump is described in document US2004146417. This pump comprises two coaxial hollow tubular bodies, each formed of two elements. These four separate elements are assembled mechanically by threaded rods and nuts.

Such a pump also implements a large number of parts, which must be assembled precisely to allow the device to operate optimally. The manufacture and assembly which result are therefore also relatively complex.

In addition, once the pump assembled, significant transverse stresses can be exerted on the assembly of the four elements, in particular the ends, tending to deform it at the level of the threaded rods, and thus to make it lose its straightness.

There is therefore a need for an electromagnetic pump with oscillating piston having, for an equivalent geometry, a simplified architecture and the installation of which is therefore facilitated.

There is also a need for a pump that is more robust than the pumps of the prior art.

Furthermore, in current pumping devices, the inlet and outlet tubing for condensates, assembled by a technician/installer, are generally connected directly on the ends of the liner 1, and generally held in position using a metal collar irreversibly mounted on the end of the tubing and the corresponding end of the liner.

When it is necessary to carry out maintenance of the pump, for example when a leak is detected, the technician must cut the tubing in order to be able to extract the pump.

This results in a loss of time and a loss of resources (the tubing must generally be changed because it is no longer the right length), and consequently an economic loss for the installer.

Consequently, there is also a need to provide a pump which can interact in a simply manner with the inlet and outlet tubing for the condensates at the ends of the liner, in such a way as to increase efficiency during maintenance operations of the pump.

3. SUMMARY OF THE INVENTION

The objective of the present invention is to address at least some of these problems of the prior art, according to its embodiments.

This objective, as well as others that will appear later, are met using an oscillating piston pump comprising:
- a first hollow tubular body in which a piston moves;
- a second hollow tubular body extending around the first hollow tubular body, bearing a solenoid controlling the movement of said piston.

According to the invention, said first tubular body and said second tubular body form a one-piece structural element.

This structural element thus constitutes a single-piece part which replaces, in a simple and effective manner, a plurality of parts, sometimes of small size, in particular the liner, the coil former, the air gap, etc., which must be assembled together with precision in the pumps of the prior art.

In other words, the first hollow tubular body and the second hollow tubular body belong to a structural member which is made in one piece. This approach makes it possible to simplify the architecture of the pump and to save time on assembly operations.

Furthermore, it strongly reduces or even removes the risk of failing of assembly of the parts during installation, which reduces the risk of malfunction of the pump.

In addition, the risk of loss of straightness due to deformation due to transverse stresses exerted on the pump during use is greatly reduced or even eliminated. In fact, having a one-piece element makes it possible to avoid the fragilities or deformations over time generated by a mechanical assembly.

This novel architecture also has an economic advantage since the one-piece structural element is less costly to manufacture than the plurality of parts used in the prior art.

According to a particular embodiment of the invention, said one-piece structural element has at least one fastening rib connecting said first tubular body and said second tubular body.

This rib makes it possible to create a connection between the first tubular element and the second tubular element in such a way as to form the one-piece element. It also makes it possible to keep apart the first tubular element and the second tubular element in such a way that a gap remains between them and so that, in other words, the two elements are not in contact.

Thus, the two elements are substantially independent in terms of stresses, i.e. the forces,—in particular transverse forces—exerted on the second tubular body are not transmitted to the first tubular body. This enables the first tubular body to retain an optimal straightness in order that the trajectory the piston is not disrupted. Without deformation of the inner walls of the first tubular body, the hydraulic performance and the reliability of the pump are optimised.

According to a particular embodiment of the invention, said one-piece structural element has at least one central fastening rib.

The central positioning of the rib enables a uniform distribution of the forces within the one-piece structural element and simplifies the manufacturing operations of this element, as well as the assembly of the parts installed on or in the structural element.

According to a particular embodiment of the invention, said one-piece structural element has an interval intended to receive at least one magnetic ring, in particular two rings, and has walls perpendicular to the axis of said first and second tubular bodies, interacting with a magnetic frame.

The one-piece structural element is thus designed so that the elements required for channelling the flux of the coil are easily installed, the magnetic ring or rings being, for example, slid around the first tubular body in the dedicated interval, and then the magnetic frame being fixed on the end walls.

According to a particular embodiment of the invention, the pump comprises means for controlling the longitudinal position of the magnetic ring or rings placed between said first tubular body and said second tubular body.

According to a particular embodiment of the invention, said means for controlling the position of the magnetic rings and/or the fastening rib, define an air gap.

Thus, the means for controlling the position of the magnetic rings can define both the air gap, necessary for the operation of the pump and the positioning of the magnetic rings along the first tubular body, on either side of the air gap, as well as their alignment.

According to a particular embodiment of the invention, said first tubular body has, at at least one of its ends, a portion intended for receiving a non-return system.

In this embodiment, the non-return system is therefore integrated with the one-piece structural element, and therefore no longer constitutes a replacement part on the first tubular body as in the prior art. This results in a gain in assembly time, cost and reliability of the pump.

According to a particular embodiment of the invention, said second tubular body bears connection means of a fixed end piece for interacting, in a direct or indirect manner, with a removable end piece.

Fixed end pieces can thus be fixed on either side of the second tubular body in such a way as to encapsulate the components of the pump. Any potential stresses of the assembly are exerted on the second tubular body, and not on the first tubular body, which enables an optimum straightness of the first tubular body to be maintained.

According to a particular embodiment of the invention, said pump comprises movable locking means, capable of interacting with said removable end piece, in a locked position, and enabling the removal of said removable end piece, in an unlocked position.

The removable end pieces, mounted on the end of the condensate tubings, can thus easily be connected to the pump and disconnected from the pump by respectively making or not making the movable locking means interact with the removable end pieces. The removal end pieces can thus be easily connected and disconnected from the pump, without the tubing being dismantled, which constitutes a gain in time and resources for the technicians.

According to a particular embodiment of the invention, said movable locking means comprise a tab that can move in translation, coming to lodge in a groove of the removable end piece.

These locking means constitute a simple and relatively low-cost solution.

According to a particular embodiment of the invention, said pump comprises a housing bearing said movable locking means.

For reasons of simplification, the protective housing of the pump directly integrates in its structure the locking means of the end pieces. Thus, the locking means are optimally positioned for their interaction with the end pieces. According to a particular embodiment of the invention, said one-piece structural element is made of plastic, and is for example obtained by injection.

4. LIST OF FIGURES

Other aims, features and advantages of the invention will become apparent on reading the following description, given by way of illustration only and not being limiting, and which relates to the attached figures, in which.

Figure 2:
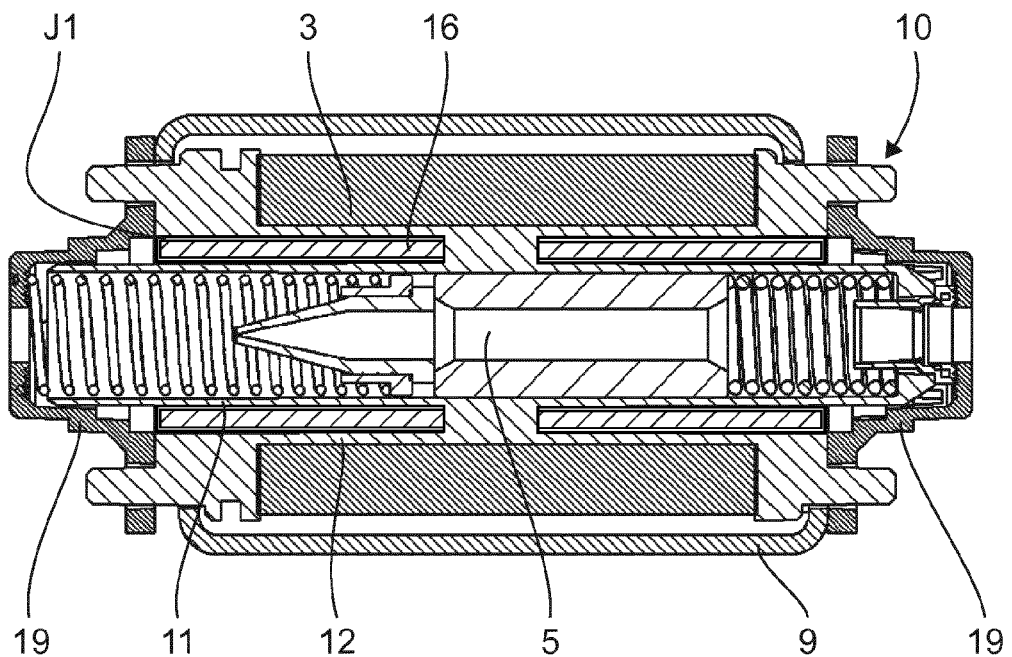
FIG. 2 is a longitudinal cross-sectional view of a pump according to an embodiment of the invention.
Figure 3:
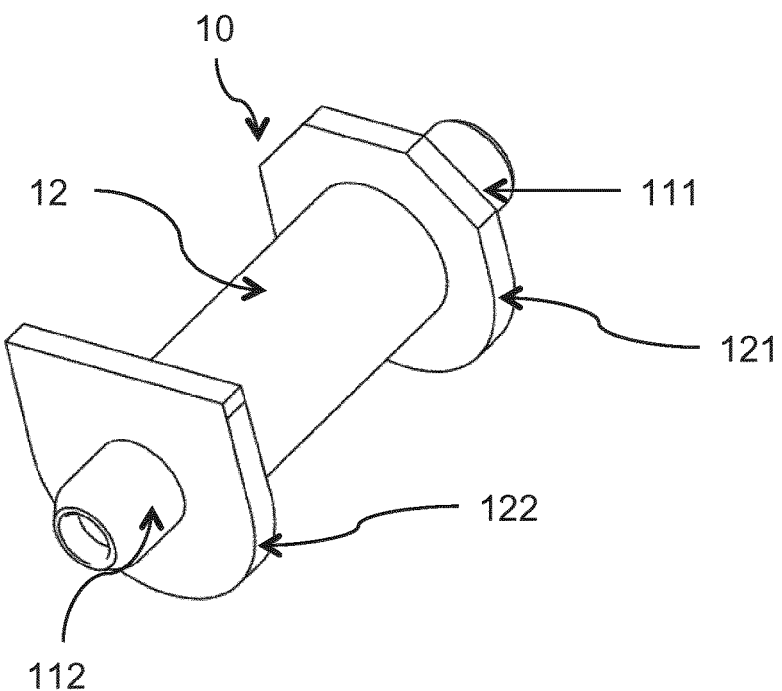
FIG. 3 is a three-dimensional view of the one-piece structural element of the pump, comprising a first and a second tube hollow tubular body, according to an embodiment of the invention.
Figure 4:
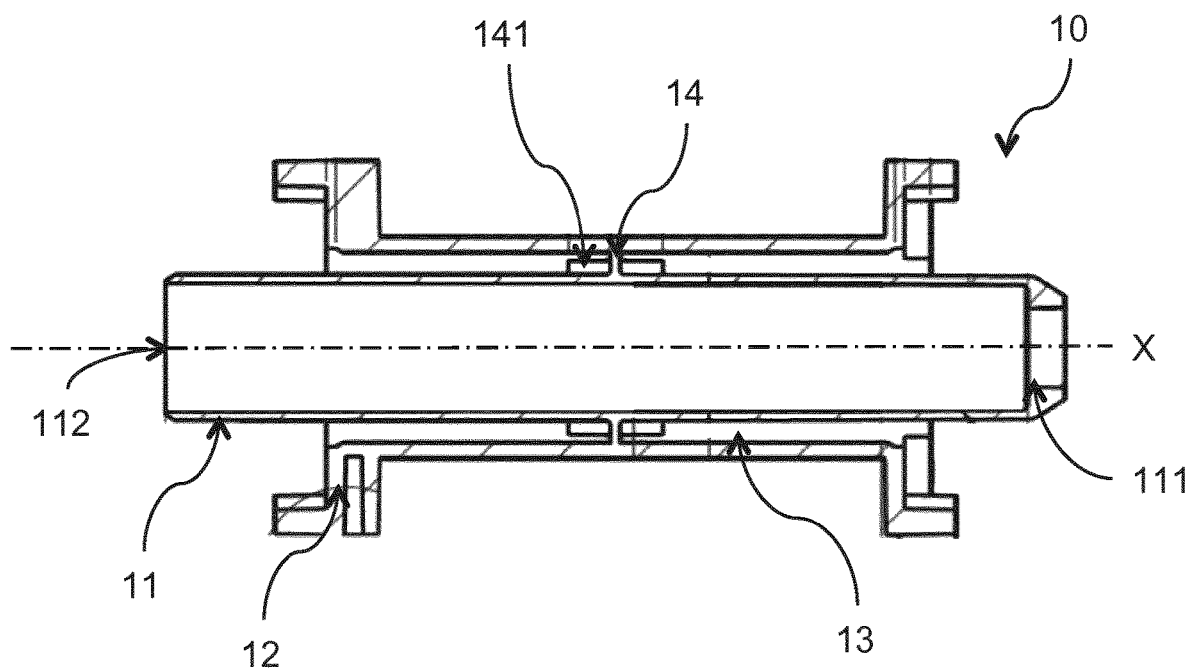
Figure 5:
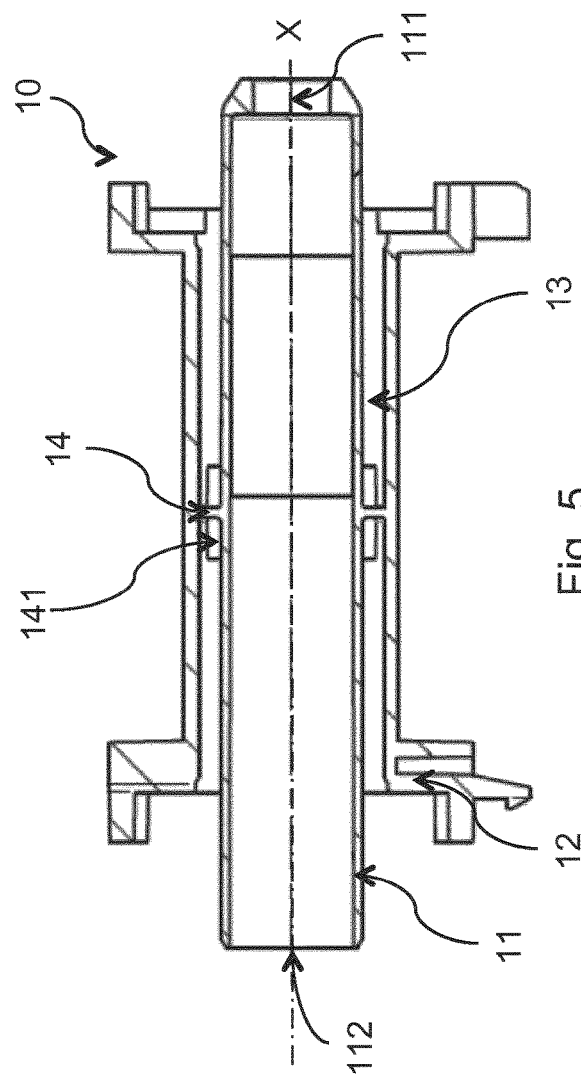
Figure 6:
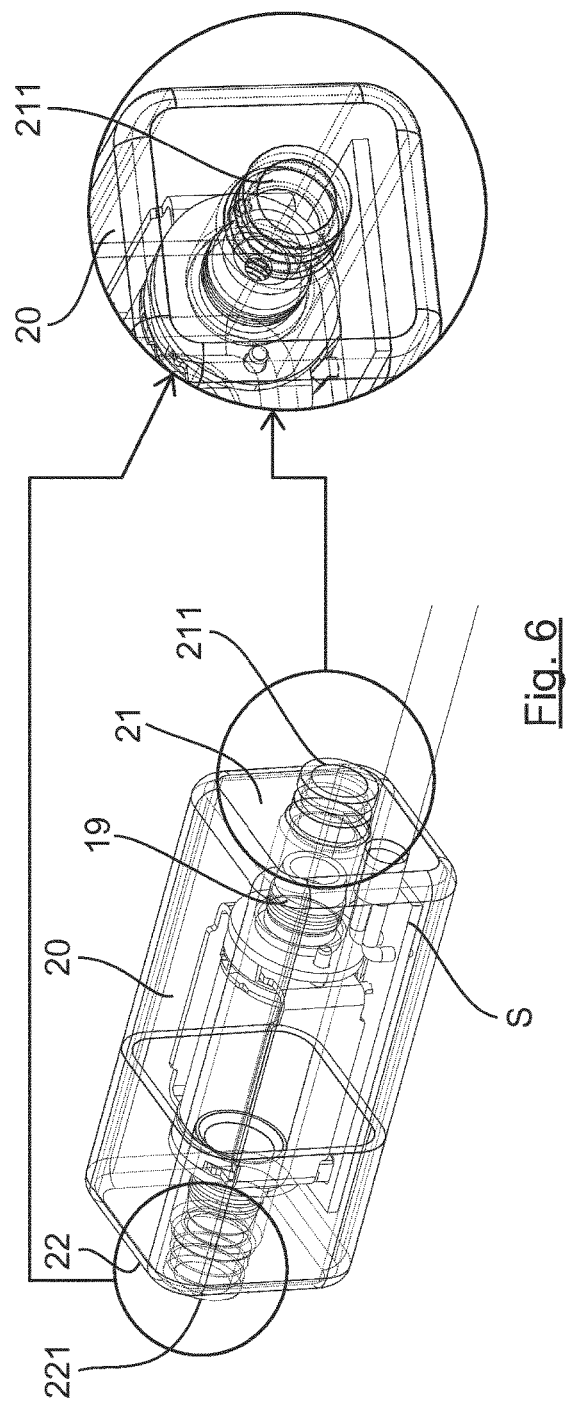
Figure 7:
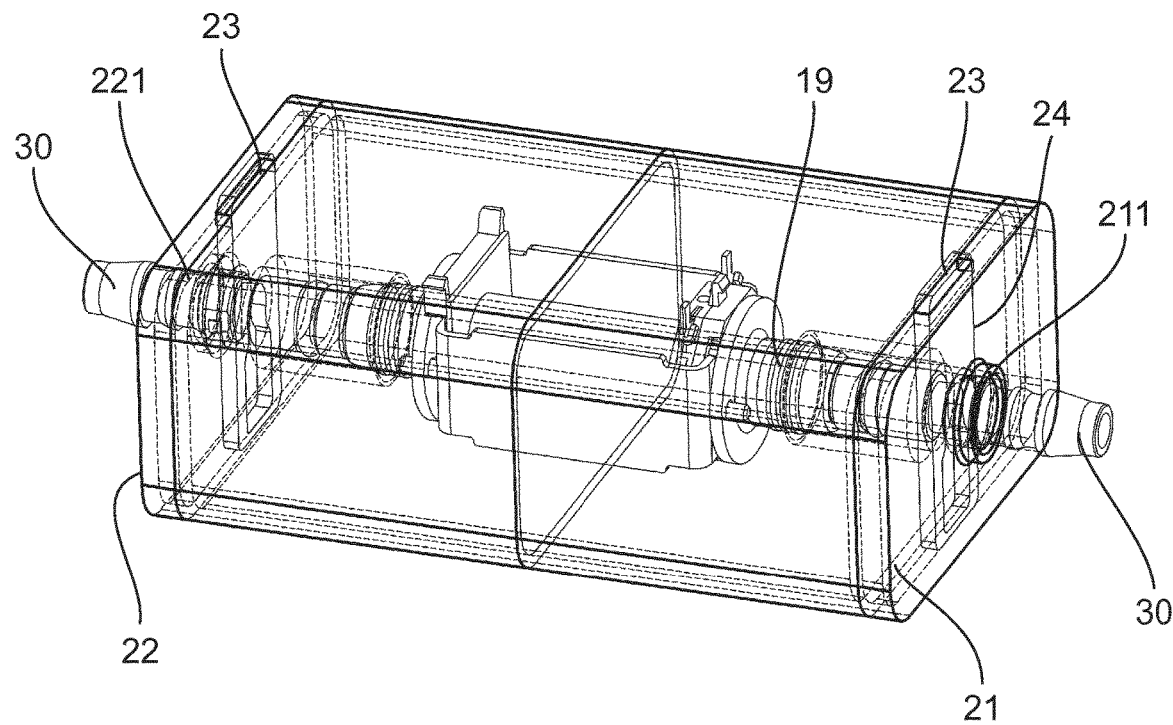
Figure 8:
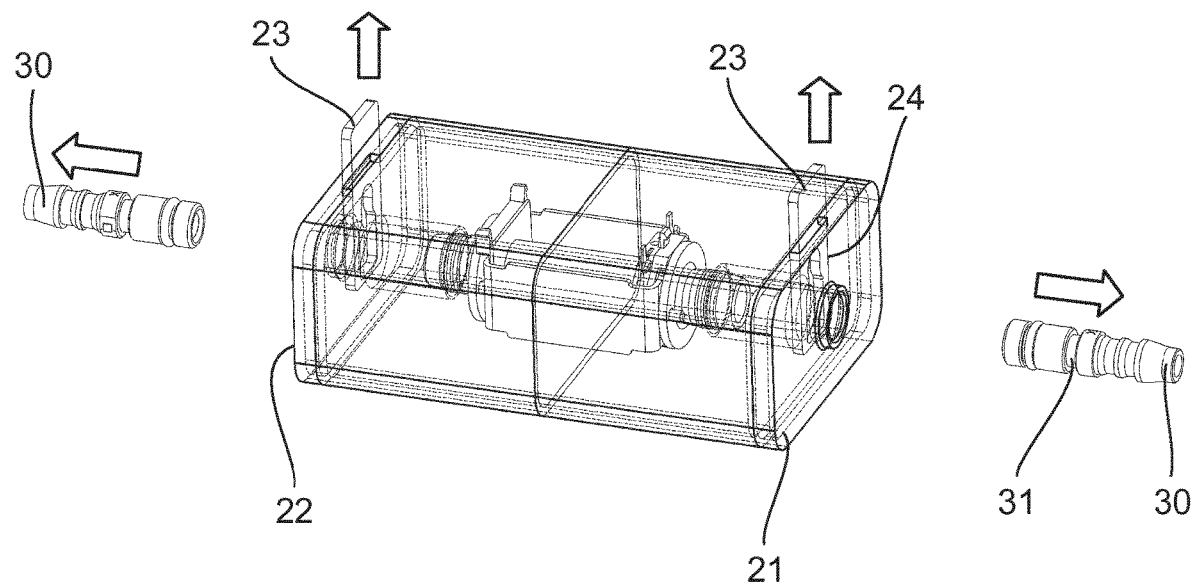

FIGS. 4 and 5 schematically illustrate, in cross-section, the one-piece structural element represented in FIG. 3;

FIG. 6 illustrates the pump system comprising the pump of FIG. 2 located within a protective housing comprising ends designed to interact with removable end pieces;

FIG. 7 is a three-dimensional view of the pump system in which the removable end pieces interact with the ends of the pump and are locked inside the protective housing;

FIG. 8 is a three-dimensional view of the pumping system in which the removable end pieces are detached from the ends of the pump.

5. DETAILED DESCRIPTION OF AN EMBODIMENT OF THE INVENTION 5.1 General Principle The general principle of the invention is based on a new approach to the architecture of an electromagnetic pump with oscillating piston, that is simplified with respect to the pumps of the prior art.

The oscillating piston pump thus uses, according to the invention, a single element, called the one-piece structural element, comprising a first hollow tubular body, or liner, in which a piston moves, and a second hollow tubular body, or coil former, which extends around the first tubular body and carries a solenoid supplied with an electric current and thus forming a solenoid enabling control of the movement of the piston.

In other words, the first hollow tubular body and the second hollow tubular body constitute a single and same part. The one-piece structural element, or support, therefore comprises two coaxial hollow tubular bodies.

The architecture of this pump is therefore greatly simplified with respect to currently existing pumps which use a relatively large number of parts: indeed, in the invention, a single part, the one-piece structural element, replaces both the liner, the coil former, and, depending on the embodiment, the air gap and the valve-holder ring of the pumps of the prior art.

Consequently, the assembly of the pump is greatly simplified since the total number of parts is reduced and because it is therefore no longer necessary to assemble, with precision, the various, more or less small, parts of existing pumps.

The risk of errors during installation and commissioning is also reduced, and the reliability of the pump is increased.

Furthermore, this simplified pump architecture represents a non-negligible economic gain, since there are less parts to manufacture and thus, as a consequence, less time (labour or machine time) is allocated to manufacturing, assembly and inspection operations.

FIGS. 2 to 5 illustrate an electromagnetic pump with oscillating piston according to a particular embodiment of the invention.

Figure 1:
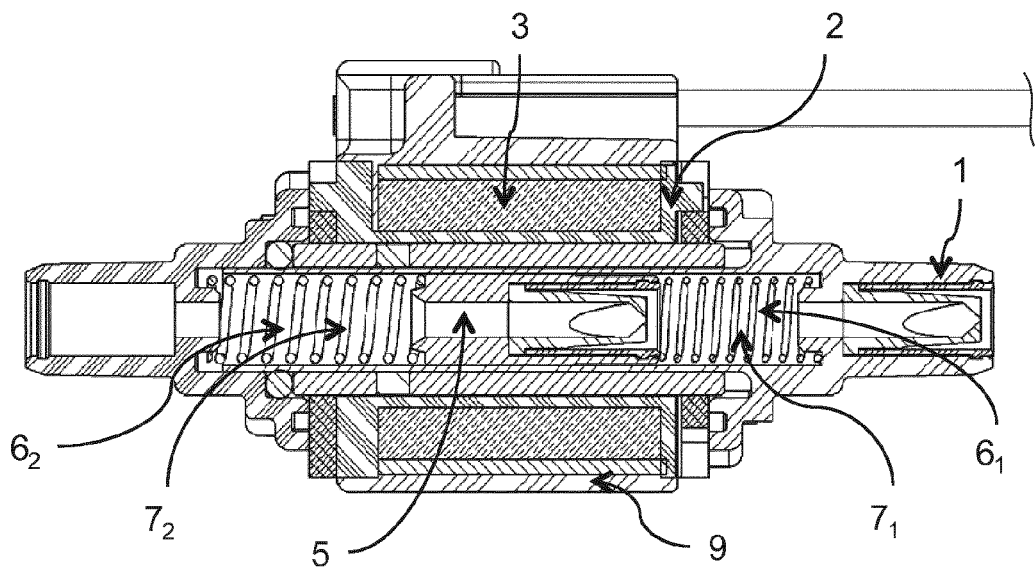
FIG. 1 is a longitudinal cross-section view of a pump from the prior art as described above.

The elements identical to the elements of the prior art illustrated in FIG. 1 carry the same reference numbers (coil 3, piston 5, magnetic frame 9, magnetic rings 16).

5.2 One-Piece Structural Element

According to this embodiment, the pump comprises a single structural element 10 which replaces the four distinct parts conventionally used in pumps from the prior art, namely a liner, a coil former, an air gap and at least one valve-holder ring.

This structural element 10 is a one-piece element, made for example of plastic, obtained for example by injection, which comprises a substantially tubular hollow body 11, or inner barrel, and a substantially tubular second hollow body 12, or outer barrel, enveloping the first body 11.

In other words, this structural element 10 is formed from a single piece, or block, comprising the first hollow tubular body 11 and the second hollow tubular body 12.

One embodiment of the one-piece structural element is more specifically illustrated in FIGS. 3 to 5.

The inner barrel 11 has an essentially cylindrical shape, with circular base, and extends along the longitudinal axis X of the pump.

It goes all the way across and therefore comprises two open ends: a first end 111, corresponding to the inlet region for condensates, and a second end 112, corresponding to the outlet region for condensates.

According to a particular embodiment, a so called "valve-holder" region is incorporated at the first end 111, enabling a non-return system to be received, reproducing the functions of a valve-holder ring in the prior art.

According to another embodiment, each of the ends 111, 112 could incorporate a valve holder. It is also possible to envisage, in a variant, that the valve-holder rings are added.

The outer barrel 12 also has a substantially cylindrical shape, with circular base, and extends along the longitudinal axis X of the pump.

Moreover, the ends of the outer barrel 12 have two plates 121, 122, or plateaus, having substantially circular or rectangular portions, and extending perpendicular to the longitudinal axis X of the barrel and of the pump.

These two plates 121, 122 define a recess for receiving a winding 3, illustrated in FIG. 2.

The inner barrel 11 is intended to receive a piston 5 mounted in a longitudinally movable manner between associated springs, in such a way as to produce alternating axial movements under the effect of the magnetic field created by the winding 3 supplied with electric current, in accordance with the principle described in above-mentioned EP2388481.

The one-piece support 10 may be provided with attachment means such as anchoring legs, clips, etc., or be secured by screwing or gluing to a support.

The inner barrel 11 and the outer barrel 12 are connected, depending on the embodiment, by a rib 14 that is placed centrally, i.e. in a plane perpendicular to the longitudinal axis X of the pump, situated substantially equidistant from the ends of the inner barrel 11 and the ends of the outer barrel 12.

In this case, this rib 14 takes the form of a ring, extending over at least a portion of the periphery of the inner barrel 11, and makes it possible to secure together the inner barrel 11 and the outer barrel 12.

The role of the rib 14 is therefore both to create a connection between the two barrels 11, 12, in order to form a one-piece element, and also to hold the outer barrel 12 apart from the inner barrel 11 in such a way that an interval 13 remains between the outer diameter of the inner barrel 11 and the inner diameter of the outer barrel 12.

The result is that the inner barrel 11 and the outer barrel 12 are practically independent in terms of stresses exerted, in other words the transverse forces exerted on the outer barrel 12 by the winding and/or by the assembly of fixed end pieces 19 and/or magnetic rings 16 are not transmitted to the inner barrel 11.

The cylindrical nature of the inner barrel 11 is therefore not impacted by the stresses to which the outer barrel is subjected, which enables the piston 5 to carry out its back-and-forth movements without unwanted friction.

Without deformation of the walls of the inner barrel 11, the hydraulic performance and reliability of the pump are optimised.

5.3 Other Elements of the Pump

The electromagnet pump according to the invention comprises, in addition to the one-piece structural element 10 described previously, a plurality of additional parts necessary for its operation, which are described in the following.

As can be seen in FIG. 4, one or more additional ribs 141 are placed in the interval 13, on either side of the main rib 14 and close to this.

The ribs 141 can, in particular, take the shape of two rings located on either side of the rib 14.

Together with the rib 14, they define the air gap region necessary for the proper operation of the pump.

The interval 13 also receives two magnetic rings 16, visible in FIG. 2, located on either side of the air gap and wedged on the outer barrel 12, i.e. on either side of the ribs 141.

These rings 16 participate in the channelling of the magnetic flux created by the coil.

The interval 13 between the two barrels 11, 12 is sufficiently large that it has a relatively large play J1 of some 1/10 mm between the inner diameter of the magnetic rings 16, once mounted, and the outer diameter of the inner barrel 11.

This play J1 ensures that the inner barrel 11 is truly independent of the outer barrel 12.

The simplified architecture of the pump as proposed by the invention thus strongly reduces the assembly and/or operating stresses applied on the first tubular body, or inner barrel, which can lead to a degradation of hydraulic performance.

A frame made of magnetic material 9 is mounted on the outer barrel 12. Then two fixed end pieces 19, visible in FIGS. 2 and 6 to 8, each including a through passage for the circulation of condensates, keep all the components of the pump encapsulated.

The fixed end pieces 19 can be fixed, for example, on each side of the one-piece support using snap assemblies formed on the outer barrel of the one-piece support, using screws, gluing, clips or any other attachment means from the prior art.

The fixed end pieces 19 are astutely produced in order to be able to interact with the removable end pieces 30 described in paragraph 5.4.

In the described embodiment, they are produced in two materials, namely a plastic portion and a seal forming portion, in order to ensure a sealing between the fixed end pieces 19, the inner barrel 11 and the removable end pieces 30 and/or the ports 211, 221.

The magnetic frame 9 is produced in a suitable material known from the prior art.

The invention is of course not limited to the single described embodiment. In particular, a pump according to the invention may have a different geometry and architecture without prejudicing the improvements contributed by the pump described by way of example.

5.4 Removable End Piece

According to another optional aspect, which is able to be implemented independently of the previously described aspects, described in relation to FIGS. 6 to 8, the invention allows the use of removable end pieces 30, or cannulas, intended to connect the pump to the suction and discharge tubing for condensates, assembled by the technician installing the pump.

As shown in FIG. 6, the pump is protected by a housing 20, thus forming a pumping system.

The side walls 21, 22 of the housing 20 situated on either side of the pump, each comprise a port 211, 221 aligned on the longitudinal axis X of the pump.

These ports 211, 221 are intended to receive a removable end piece 30 provided to interact with the pump.

More precisely, one end of the end pieces 30 is provided to interact with the fixed end pieces 19 of the pump or directly with the ports 211, 221, and the other end of the end pieces 30 is provided to interact with a tubing, or conduit, for circulation of condensates, assembled by the technician.

When they are put in place, the end pieces 30 extend along the longitudinal axis X of the pump.

According to the invention, the end pieces 30 are removable, or detachable, in other words they can be easily and quickly extracted from the pump and from the housing 20 by a technician, and put back in place, for example during maintenance operations of the pump.

The advantage is that the removable end pieces can then be disconnected from the pump without the inlet and outlet tubing for the condensates being dismantled.

In other words, the removable end pieces play the role of intermediate parts between the pump and the input and output tubing for the condensates.

They also enable the stresses exerted on the pump by the technician to be eliminated, since these are then exerted either on the housing 20 or on the end piece 30 of the pump system, and not on the inner barrel.

A locking and unlocking system of the end pieces is provided, which can be seen in FIGS. 7 and 8.

FIG. 7 illustrates the removable end pieces 30 in the locked position, i.e. inserted in the ports 211, 221 of the housing 20 and each held in position by a tab 23 coming to be lodged in the side wall 21, 22 of the housing.

More precisely, the walls 21, 22 comprise a slide 24, inside of which the tab 23 slides along an axis that is perpendicular to the longitudinal axis X of the pump.

The removable end pieces 30 in turn comprise at least one groove 31 inside which the tab 23 comes to rest, in the locked position, in such a way as to prevent the withdrawal of the end pieces 30.

FIG. 8 illustrates the end pieces 30 in the unlocked position, i.e. extracted from the ports 211, 221 of the housing 20, the tabs 23 having slid outside of the slides 24 of the housing 20, and therefore outside the grooves 31 of the end pieces.

According to an alternative embodiment, the removable end pieces 30 are elbowed.

The removable end pieces 30 can also carry a non-return valve and/or non-discharge valve, in order to prevent the condensates present in the tubing from leaking out when the technician disconnects the end pieces in order to work on the pump.

The invention claimed is:

1. An oscillating piston pump comprising:
    a piston;
    springs associated with the piston;
    a first tubular body receiving the piston, which is movable into said first tubular body, wherein the first tubular body also receives the springs associated with the piston, the piston being mounted in the first tubular body in a longitudinally movable manner between the springs; and
    a second tubular body concentrically extending around the first tubular body, and bearing a solenoid for controlling the movement of said piston in the first tubular body,
    wherein said first tubular body and said second tubular body form a one-piece structural element, said first tubular body comprising first and second open ends, the first open end corresponding to a condensate inlet zone and the second open end corresponding to a condensate outlet zone, and
    wherein said one-piece structural element has at least one central fastening rib connecting said first tubular body and said second tubular body, said central fastening rib being formed at equal distances from each of the first and second open ends.

2. The oscillating piston pump according to claim 1, wherein said one-piece structural element has a gap to receive at least one magnetic ring and has walls perpendicular to an axis of said first and second tubular bodies, interacting with a magnetic frame.

3. The oscillating piston pump according to claim 2, wherein the at least one central fastening rib controls a longitudinal position of said at least one magnetic ring placed between said first tubular body and said second tubular body.

4. The oscillating piston pump according to claim 3, wherein:
the at least one magnetic ring comprises a pair of magnetic rings; and
the at least one central fastening rib defines a gap between the pair of magnetic rings.

5. The oscillating piston pump according to claim 1, wherein said first tubular body has, at least one of the first or second ends of the first tubular body, a portion provided to receive a non-return system.

6. The oscillating piston pump according to claim 1, wherein said second tubular body bears a connector for connecting to at least one fixed end piece that is able to interact with a removable end piece.

7. The oscillating piston pump according to claim 6, comprising a movable lock, configured to interact with said removable end piece, in a locked position, and enabling removal of said removable end piece, in an unlocked position.

8. The oscillating piston pump according to claim 7, wherein said movable lock comprises a tab that can move in translation, coming to lodge in a groove in the locked position.

9. The oscillating piston pump according to claim 8, comprising a housing bearing said movable lock.

10. The oscillating piston pump according to claim 1, wherein said one-piece structural element is made of plastic.

11. The oscillating piston pump according to claim 10, wherein said one-piece structural element is an injection molded one-piece structural element.

12. The oscillating piston pump according to claim 1, comprising a housing containing the first and second tubular bodies, wherein the first tubular body extends over an entire length of an interior of the housing.

13. An oscillating piston pump comprising:
a piston;
springs associated with the piston;
a first tubular body receiving the piston, which is movable into said first tubular body, wherein the first tubular body also receives the springs associated with the piston, the piston being mounted in the first tubular body in a longitudinally movable manner between the springs; and
a second tubular body concentrically extending around the first tubular body, and bearing a solenoid for controlling the movement of said piston in the first tubular body,
wherein said first tubular body and said second tubular body form a one-piece structural element, said first tubular body comprising first and second open ends, the first open end corresponding to a condensate inlet zone and the second open end corresponding to a condensate outlet zone,
wherein said one-piece structural element has a gap to receive at least one magnetic ring and has walls perpendicular to an axis of said first and second tubular bodies, interacting with a magnetic frame, and
wherein the at least one central fastening rib controls a longitudinal position of said at least one magnetic ring placed between said first tubular body and said second tubular body.

14. The oscillating piston pump according to claim 13, wherein:
the at least one magnetic ring comprises a pair of magnetic rings; and
the at least one central fastening rib defines a gap between the pair of magnetic rings.

* * * * *